United States Patent [19]

Pryor

[11] 4,127,772
[45] Nov. 28, 1978

[54] MOIRE OPTICAL TRANSDUCER
[75] Inventor: Roger W. Pryor, Trumbull, Conn.
[73] Assignee: Pitney-Bowes, Inc., Stamford, Conn.
[21] Appl. No.: 830,450
[22] Filed: Sep. 6, 1977
[51] Int. Cl.² .............................................. H01J 39/12
[52] U.S. Cl. .................................. 250/237 G; 356/374
[58] Field of Search ...................... 250/237 G, 231 SE; 356/169

[56] References Cited
U.S. PATENT DOCUMENTS
3,427,463  2/1969  Weyrauch ....................... 250/237 G

*Primary Examiner*—David C. Nelms
*Assistant Examiner*—Darwin R. Hostetter
*Attorney, Agent, or Firm*—Peter Vrahotes; William D. Soltow, Jr.; Albert W. Scribner

[57] ABSTRACT

A moire optical transducer is described which has a minimal optical operating error. In normal moire grating sets, the lines of the gratings each inherently possess a periodic error in line spacing. This periodic error cannot be eliminated, but through the use of the instant invention, its influence on the optical operation of the transducer can be minimized. The stationary grating set has at least one window of grating lines. The length of the window is made to be a length which is a multiple of the length of the periodic error in the movable grating set. The net result is a decisive cancellation of a major portion of the error.

8 Claims, 4 Drawing Figures

MOIRE OPTICAL TRANSDUCER

This invention pertains to moire optical systems and more particularly to an improved moire optical transducer.

BACKGROUND OF THE INVENTION

All grating sets for moire optical transducers have an inherent error in their line spacings. This error is periodic in nature and is due to the lack of precision of the line generating mechanism. Generally, there is very little that can be done to correct this type of inherent inaccuracy, but in the present situation something can be done. It has been discovered that optical functioning of the grating sets can be improved by choosing the correct parameters for the optical windows of the grating sets. This results in optimizing the grating sets such that the effects of the inherent error is kept to a minimum.

SUMMARY OF THE INVENTION

This invention relates to an improvement in the grating sets of moire optical transducers. Each grating set is comprised of a movable plate and a stationary plate. The plates are disposed adjacent and parallel to each other. The stationary plate has at least one grating area defining an optical window through which a light beam is directed. When the movable grating moves past the window, the optical light pattern will change. This can be detected by a photodetector device such as a photocell or phototransistor.

The line spacings of the movable plate possess an inherent periodic error, which results from the inaccuracy of the line generating, dividing (ruling) engine. In other words, the lines of the movable grating are not evenly spaced.

It has been discovered that the length of the stationary grating or window area of the stationary plate influences the degree to which the inaccuracy of the movable grating is felt. By making the length of the window a multiple of the length of the periodic error of the movable grating, the effects of this inaccuracy are kept to a minimum. The length of the periodic error is that distance necessary for the line spacing error to begin to repeat itself, i.e. the distance over which one cycle of line spacing error is displayed.

The cyclic length of the error may only be a hundredth of an inch, while the length of the stationary window may be a tenth of an inch. However, as long as the length of the stationary window is made a multiple of the length of the periodic error of the movable grating, the optical effects of this error will be held to a minimum.

It is an object of this invention to provide an improved moire optical transducer;

It is another object of the invention to provide a moire optical transducer whose inherent periodic line spacing error is minimized by the proper selection of grating parameters;

These and other objects of this invention will be better understood and will become more apparent with reference to the following detailed description taken in conjunction with the accompanying drawings in which.

DETAILED DESCRIPTION

Figure 1:
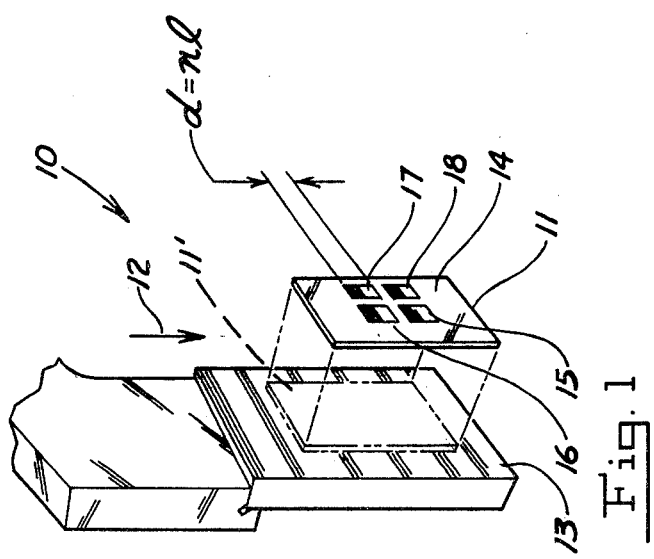
FIG. 1 is a perspective view of a typical grating set for a moire optical transducer.

Now referring to FIG. 1, a grating set 10 for a moire optical transducer is shown. The transducer is the kind which is used for linear measurement of displacements or deflections in instrumentation. The grating set 10, comprises a stationary plate of glass 11, and a movable (arrow 12) plate of glass 13. The plate 11 is depicted in exploded view fashion. In operation, this piece of glass occupies the space designated 11'. The two pieces of glass 11 and 13 are adjacent and parallel to each other. These two plates are generally separated by a few thousandths of an inch. Glassplate 13 has rulings (lines) which are opaquely deposited thereon. Glass plate 11 has opaquely deposited rulings (lines) in four window areas 15, 16, 17, and 18. The rest of the glass area 14 is opaquely silvered.

A light beam (not shown) is passed through grating 13 and gratings (windows) 15, 16, 17, and 18, respectively. Photodetectors (not shown) are positioned opposite each window area. When grating 13 is caused to deflect (arrow 12), a moire pattern is generated, and the photodetectors detect the movement of the grating 13 by means of the changing moire pattern.

Up until now, the discussion has revolved about subject matter well known in the art.

Figure 2:
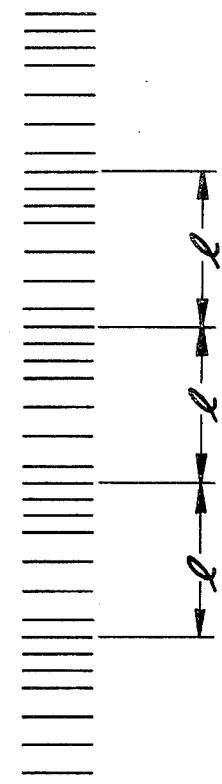
FIG. 2 is an enlarged plan view of the lines of the movable grating shown in FIG. 1.

The invention concerns an optimization of an optical feature of this aforementioned system. It is well known that certain errors exist in the glass, or to be more precise, in the rulings (lines). One such error, is that the dividing generator inscribes the lines in the glass with an uneven spacing, as can be seen in FIG. 2, which is an enlarged representation of the lines of the movable grating 13. As can also be seen from FIG. 2, the unevenness of the line spacing has a periodicity of a length "l".

The unevenness of the line spacing effects the accuracy of the deflection measurement. Therefore, if this error can be minimized, the optical operability of the transducer will be improved.

Figure 4:
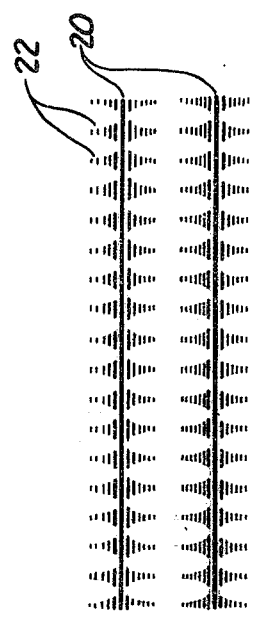
FIG. 4 is an enlarged view of the optical fringe pattern produced by the grating lines of FIG. 2 illustrating the effect of the line spacing errors.
Figure 3:
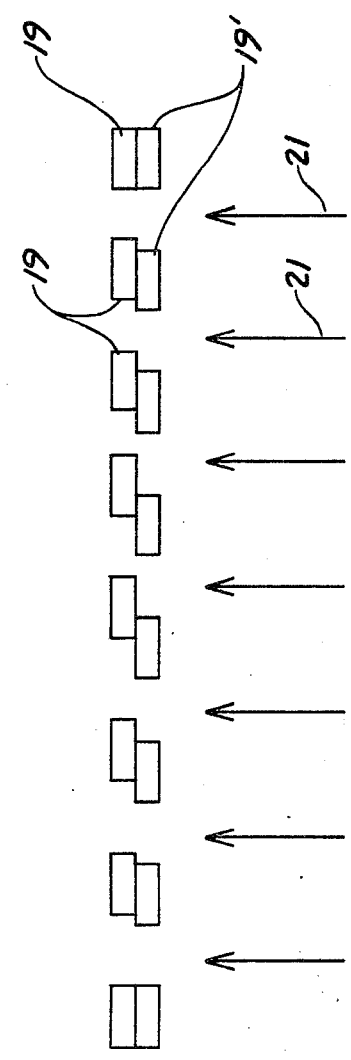
FIG. 3 is an exaggerated view of the lines of the two adjacently disposed gratings of FIG. 1.

To better understand the problem, let us look at FIG. 3, which is an exaggerated view of the lines 19 of grating 13 superimposed upon the lines 19' of either of the windows 15, 16, 17, or 18, respectively. As can be seen, the periodic error causes the lines 19 and 19' not to match-up. At any one instant of travel (arrow 12) of grating 13, this non-matching will tend to expand the width of the fringe lines produced when the light beam (arrow 21) is shined through the lines. This expansion of the fringe line is schematically depicted in FIG. 4. As will be seen, the fringe lines 20 now have a halo-like expanse 22. These width expansions 22 are seen by the photodetectors as part of the lines 20. Therefore, the expanded width 22 of the lines 20 give a false reading and hence, inaccurately define the exact position or movement of the fringe lines 20.

The invention is concerned with eliminating, or at least minimizing, the above-mentioned error.

It has been discovered that this error can be eliminated, or in the least minimized, by making the length "$d$" of the windows 15, 16, 17 and/or 18 a multiple of the length "$l$" (the periodic error length) of the movable grating 13:

$$d = n\,l$$

where:
 "$d$" is the length of the window.
 "$n$" is an integer. and
 "$l$" is the length of the periodic error.

The reason that this reduces the error, is that over a cyclic length of the error, the high's cancel the low's. Therefore, a cyclic length or multiple therefore, will provide the least error. By making the window gratings a multiple length of the line spacing period, the least amount of error is achieved.

In most transducer grating sets 10, the window areas may be in phased optical guadrature as shown in FIG. 1, or they may be in another arrangement such as a single window. The arrangement of the windows is usually a function of the particular transducer, or transducer electronics, which is not the subject of the present invention.

Having thus described the invention, what is desired to be covered by Letters Patent is represented by the appended claims.

What is claimed is:

1. An improved moire optical transducer used in linear measurements, comprising:
 a grating set having a pair of glass plates with opaque lines disposed on each plate, a first plate of said grating set being movable with respect to a second plate of said grating set in order to form an optical moire pattern, said first movable plate having an inherent periodic error in its placement of the lines upon said glass such that the lines are not evenly spaced from each other, said periodic error having a given length of periodicity, said second plate having a grating length defining a window area length, the length of said window being a multiple of said periodic line spacing error length of said first plate grating, whereby the grating set possesses a minimum optical operating error resulting from said periodic line spacing error.

2. The moire optical transducer of claim 1, wherein said second plate is stationarily disposed with respect to said first movable plate.

3. The moire optical transducer of claim 2, wherein said second stationary plate has a plurality of windows each having a length that is a multiple of the periodic line spacing error length of said first plate grating.

4. The moire optical transducer of claim 3, wherein said second stationary plate has four windows that are in optical phase quadrature with respect to each other.

5. A moire optical transducer used in linear measurements, comprising:
 a pair of first and second transparent plates forming a grating set, each plate of said grating set having opaque lines disposed thereon, said first plate of said grating set being movable with respect to said second plate of said grating set in order to form an optical moire pattern, said first movable plate having an inherent periodic error in its placement of the lines upon said transparent plate such that the lines are not evenly spaced from each other, said periodic error having a given length of periodicity, said second plate having a grating length defining a window area length, the length of said window being a multiple of said periodic line spacing error length of said first plate, whereby the grating set possesses a minimum optical operating error resulting from said periodic line spacing error.

6. The moire optical transducer of claim 5, wherein said second plate is stationarily disposed with respect to said first movable plate.

7. The moire optical transducer of claim 6, wherein said second stationary plate has a plurality of windows each having a length that is a multiple of the periodic line spacing error length of said first plate.

8. The moire optical transducer of claim 7, wherein plate has four windows that are in optical phase quadrature with respect to each other.

* * * * *